United States Patent [19]

Hayashi et al.

[11] Patent Number: 5,099,612
[45] Date of Patent: Mar. 31, 1992

[54] DOOR WEATHER STRIP

[75] Inventors: Keizo Hayashi, Nagoya; Masami Yamada; Masahiro Nozaki, both of Aichi, all of Japan

[73] Assignee: Toyoda Gosei Co., Ltd., Nishikasugai, Japan

[21] Appl. No.: 666,486

[22] Filed: Mar. 6, 1991

Related U.S. Application Data

[63] Continuation of Ser. No. 333,699, Apr. 5, 1989, abandoned.

[30] Foreign Application Priority Data

Apr. 14, 1988 [JP] Japan ............... 63-50387[U]
Apr. 14, 1988 [JP] Japan ............... 63-50389[U]
Apr. 15, 1988 [JP] Japan ............... 63-94352

[51] Int. Cl.⁵ ............................................. E06B 7/16
[52] U.S. Cl. ................................... 49/479; 49/491; 49/497
[58] Field of Search ............ 49/479, 490, 497, 498, 49/491; 425/465, 466

[56] References Cited

U.S. PATENT DOCUMENTS

| 4,333,221 | 6/1982 | Hayashi . |
| 4,339,860 | 7/1982 | Hayashi . |
| 4,424,976 | 1/1984 | Hayashi . |
| 4,495,234 | 1/1985 | Tominaga et al. ............ 49/490 |
| 4,531,326 | 7/1985 | Ballocca et al. . |
| 4,787,668 | 11/1988 | Kawase et al. . |

FOREIGN PATENT DOCUMENTS 59-171735  9/1959  Japan .

Primary Examiner—Kenneth J. Dorner
Assistant Examiner—Gerald A. Anderson
Attorney, Agent, or Firm—Cushman, Darby & Cushman

[57] ABSTRACT

The present invention is directed to a door weather strip in which the corner portions thereof are integrally formed with straight portions thereof. In order to obtain a predetermined sealing interference, the cross sectional shape of the corner portions of hollow sealing portion and the lip seal of the weather strip is arranged to be longer than that in the straight portion. Alternatively, the sealing portion is raised as to have a predetermined shape when the corners are formed. Said formed shapes are solidified by vulcanization after the weather strip has been plastic deformed before the vulcanization.

11 Claims, 10 Drawing Sheets

DOOR WEATHER STRIP

This is a continuation of application Ser. No. 07/333,699, filed on Apr. 5, 1989 now abandoned.

BACKGROUND OF THE INVENTION

The present invention relates to a door weather strip to be secured to a portion of a car body panel corresponding to a trunk lid, a car door sash, and flanges of the car body panel which corresponds to the car door.

Although the description will be given referring to a door weather strip to be installed to a portion of a car body panel which corresponds to a trunk lid, the present invention can be embodied in the other door weather strips.

The door weather strip to be secured to the portion of a car body panel which corresponds to a trunk lid, as shown in FIG. 1, comprises: an inverted U-shape holding portion 3 in which an insert 1 has been embedded; a hollow sealing portion 6 connected to the top portion of the inverted U-shape holding portion 3 with a neck portion; and a lip seal portion 5 connected to either side of the inverted U-shape holding portion 3.

The inverted U-shape holding portion 3 is made of solid rubber and including a plurality of pairs of holding lips 8 and 9 for the purpose of holding the car body flange 21 in the trunk portion. The hollow sealing potion 6 is made of sponge rubber.

The weather strip of the type described above is made of an integrally extruded work in order to decrease the number of the joining portions in the mold for improving productivity, and is cut to be made a predetermined length before joining the two ends thereof to form a ring.

However, it is feared that the following problem will arise when the weather strip of the type described above is installed to the car body panel.

As shown by an alternate long and two short dashes line in FIG. 1, a hollow sealing portion 6 is fallen to the outside of the car body in a corner portion (portions A and B shown in FIG. 2). It can arise a fear that the compression strain with respect to the hollow sealing portion 6 for sealing a trunk lid 23 cannot meet a predetermined sealing interference.

In order to overcome the above-described problem, a structure can be employed in which the height of projection of the hollow sealing portion 6 is arranged to be relatively high. However, the degree of the compression strain in the hollow sealing portion 6 becomes too large throughout the circumference, causing the load required to close the trunk lid 23 to become too large.

Furthermore, the lip seal portion 5 can deform downward, and it can be thereby turned and caught inside as shown in FIG. 3 when the weather strip is mounted to the car body panel.

To this end, an object of the present invention is to provide a weather strip which is capable of overcoming the above-described problems.

SUMMARY OF THE INVENTION

An embodiment of the present invention is directed to an weather strip for use in a trunk portion having corners thereof integrally formed with straight portions thereof and to be formed in an annular shape, the weather strip comprising: an inverted U-shape holding portion; and a hollow sealing portion connected to a top portion of the inverted U-shape holding portion, wherein the corner portion of the hollow sealing portion is formed in a vertically elongated shape in the sealing direction in cross section thereof as to obtain a predetermined sealing distance when the weather strip is installed to a car body.

According to this embodiment of the weather strip of the present invention, when the weather strip for a trunk portion or a door sash portion is installed to a car body panel, the hollow sealing portion is, similarly to the conventional weather strip, fallen to the outside of the car body panel at the corners. However, a predetermined sealing interference by the hollow sealing portion in the corner portion in the trunk lid or the car body panel can be secured since the shape of the corner portion is arranged to be able to compensate its falling to the outside of the car body panel.

In addition, when the weather strip having a lip seal portion of the shape facing laterally in the cross sectional shape for use in an opening on which a door is mounted is installed to a car body panel, the lip seal portion is further bent in the corner portions. However, a predetermined sealing length obtained by the lip seal portion with respect to the area to be sealed can be easily secured since this lip seal portion is arranged to become a shape which can compensate the increase in bending of the lip seal portion.

Another embodiment of the present invention is directed to an weather strip having corners integrally extruded with straight portions wherein both or either of the corner portion of the hollow sealing portion or the lip seal portion is raised as to become a predetermined shape when the corner is formed.

According to the embodiment of the weather strip of the present invention, when the weather strip for use in a trunk portion is installed to a car body panel, the hollow sealing portion can be prevented from being fallen in the direction of the outside of the car body panel, or the interference for sealing the trunk lid by the hollow sealing portion can be easily meet a predetermined interference with respect to the conventional weather strip. In addition, the downward deformation of the lip seal portion, causing the same to be turned inside when the weather strip is installed to a car body panel can be prevented.

Similarly, when the weather strip for use in a door sash is installed to a car body panel, the deformation generated in the corners can be compensated, as a result of which, a problem that the sielding lip falls to the inside of the car body panel can be overcome.

The other embodiment of the present invention is directed to a method of manufacturing the weather strip of the type described above characterized by: a process in which the weather strip is extruded as to realize state where the same cannot be substantially contracted or the same has a contraction which can be estimated; a process in which the weather strip which has not as yet been vulcanized is applied with a pressure from outside as to be locally plastic-deformed during the movement of the extruded work; a process in which the extruded work is vulcanized as to solidify the plastic-deformation in part; and vulcanization is performed.

As a result of this, when a deformed portion is formed in the weather strip which has not been as yet vulcanized, it does not need to deform the orifice of the extruding head. That is, since the outer surface of the orifice is not divided, the work which has been extruded through such orifice can be made free from any burrs.

In addition, since the orifice can be formed uniform, extrusion line can be prevented from generation.

PREFERRED EMBODIMENT OF THE INVENTION

Figure 1:
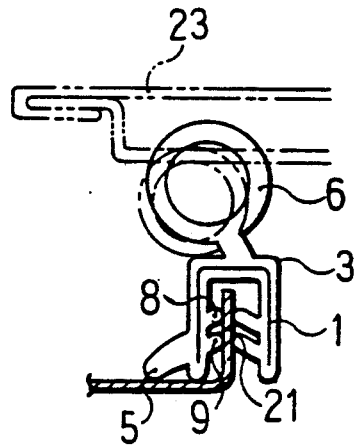
FIG. 1 is a cross-sectional view which illustrates a state where a weather strip for use in a trunk portion is installed.
Figure 2:
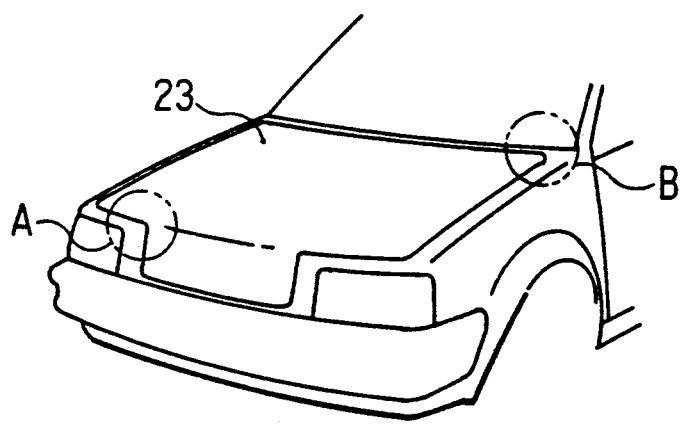
FIG. 2 is a rear perspective view which illustrates an automobile in which the positions of the weather strip for the trunk are illustrated.

A. Embodiments of the present invention will now be described with reference to the drawings. The portions which have been described are given the same reference numerals, and descriptions upon them are omitted.

Figure 4:
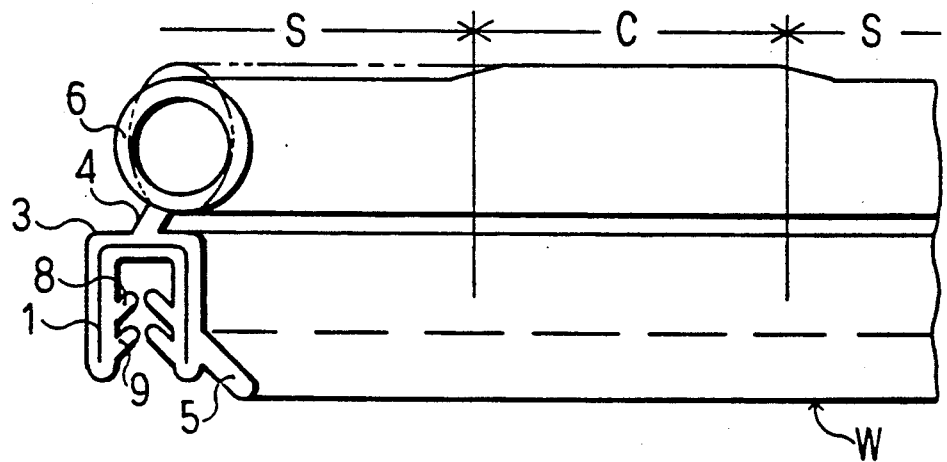
FIG. 4 is a side elevational view illustrating the surface of a product formed by extrusion molding for use in an embodiment of the weather strip for the trunk portion.

(1) FIG. 4 is a side elevational view illustrating the surface of an extruded work for use in the weather strip shown in FIG. 1 according to the present invention.

This weather strip comprises an inverted U-shape holding portion 3, a hollow sealing portion 6 connected to the top portion of the inverted U-shape holding portion 3 with a neck portion 4, and a lip seal 5. The above-described structure is the same as that of the conventional weather strip.

In order to obtain a predetermined sealing interference from the corner portion C of the hollow sealing portion 6 when this weather strip is installed to the automobile, the cross sectional shape thereof is arranged to have a rather elongated vertical-length with respect to the sealing direction than that of the straight portion S of the hollow sealing portion 6 (the cross-sectional shape is shown by an alternate long and two short dashes line). The other portions, that is, the straight portions S are, as it is, shaped by the extrusion.

Figure 5:
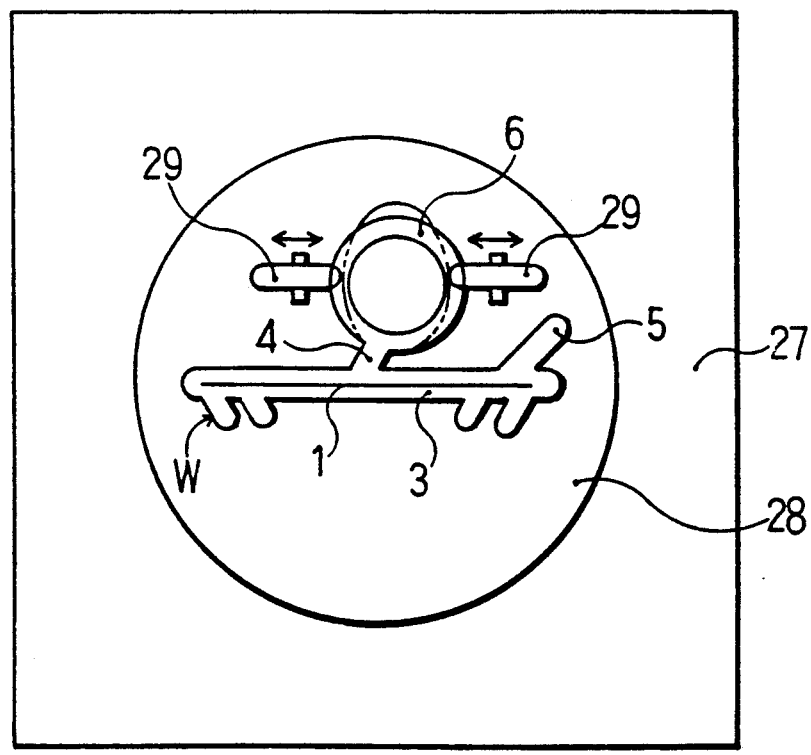
FIG. 5 is a front view which illustrates an example of a method of manufacturing the the extruded work.

For example, such weather strip can be obtained by the following manufacturing method (see FIG. 5):

a pair of forming rollers 29 and 29 are disposed immediately in front of an extruding die 28 installed to an extruding head 27 of an extruder, each of this pair of the forming rollers 29 and 29 being reciprocated with being confronted each other in the direction perpendicular to the extruding direction. The hollow sealing portion 6 of an extruded work w which has not been as yet subjected to the vulcanizing process and supplied from the extruding die 28 is intermittently pressed by the forming rollers 29 and 29 from two sides thereof so that its shape is deformed as to be vertically elongated by the needed distance, that is, by the distance to form the corner C.

This weather strip is made of rubber containing solid rubber or containing sponge rubber such as ethylene propylene rubber and chloroprene rubber.

The thus-extruded work is then cut to become a predetermined length, and two ends thereof are connected to each other as to form a ring.

The thus-manufactured weather strip is, similarly to the description given above, installed to a car body flange 21 in the trunk portion. In this state, the corner portion C of this hollow sealing portion 6 has been previously formed in a vertically elongated shape as to be formed to a predetermined shape after the corner has been formed. Therefore, the problem experienced with the conventional weather strips that the hollow sealing portion 6 falls to the outside of the car body, causing the sealing interference on the trunk lid 23 sealed by this hollow sealing portion 6 to become impossible to satisfy the predetermined valve when the trunk is closed can be prevented.

Figure 6:
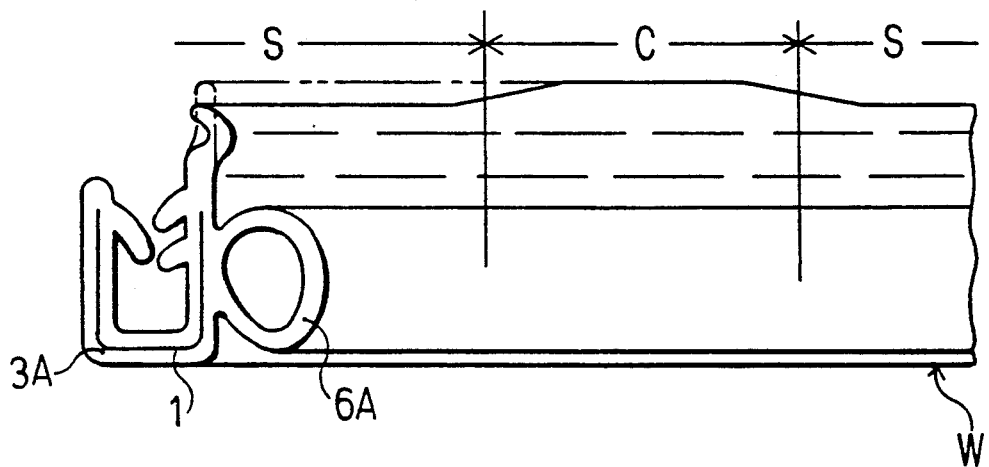
FIG. 6 is a side elevational view illustrating the surface of an extruded work for use in the embodiment of the present invention of an opening on which a door is mounted.
Figure 7:
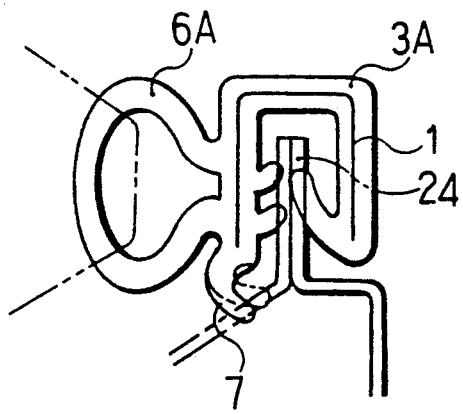
FIG. 7 is a cross-sectional view which illustrates a state where the weather strip for use in the opening on which the door is installed.
Figure 8:
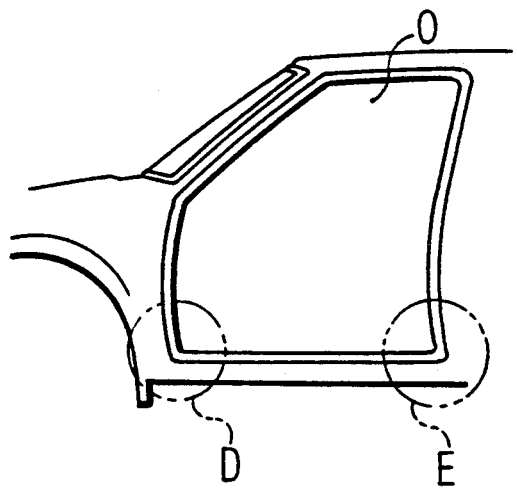
FIG. 8 is a partial cross-sectional view of an automobile for illustrating positions for the weather strips for use in the opening on which the door is mounted.

(2) FIG. 6 is a side elevational view illustrating the surface of an extruded work for use in the embodiment of the weather strip according to the present invention to be installed to an opening on which a door is mounted.

This weather strip comprises an inverted U-shape holding portion 3A for holding the door side flange 24, a hollow sealing portion 6A formed on the side of the inverted U-shape holding portion 3A confronting the outside of the car body, and a bent lip seal 7 having a cross-sectional shape which faces laterally and formed by extending the portion of the flange holding portion 3A confronting the inside of the car body.

According to the structure of this embodiment, the corner portion C of the lip seal 7 is arranged to have an elongated cross-sectional shape in the sealing direction with respect to the straight portion S in order to obtain a predetermined sealing interference after it has been installed to the car body (its cross-sectional shape is shown by a alternate long and two short dashes line). The other portions, that is, the straight portions S are formed to have the extruded shape as it is.

The extruded work w is, similarly to the above-described embodiment, cut to become a predetermined length, and the two ends thereof are connected to each other as to become an endless weather strip.

The thus-manufactured weather strip can compensate the deformation generated in the laterally facing bent lip sealing portion (see the alternate long and two short dashes line) at the corners D and E when it has been installed within the door opening O of the car body. Therefore, the predetermined sealing interference obtained by the lip seal 7 can be easily secured.

Figure 9:
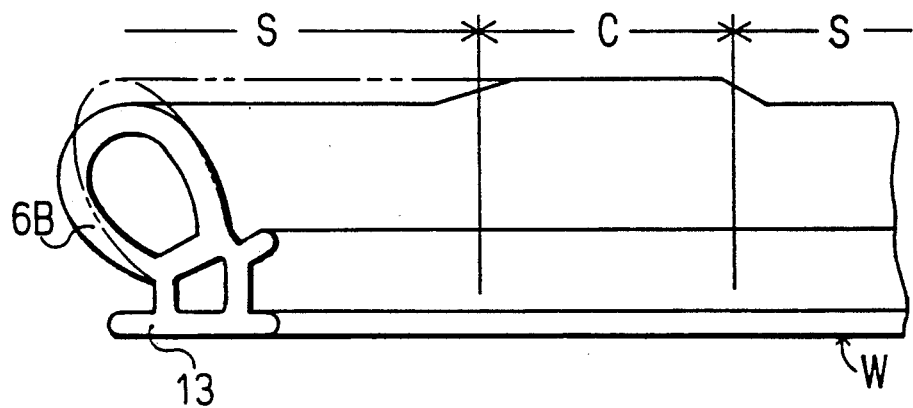
FIG. 9 is a side elevational view illustrating the surface of an extruded work for use in the embodiment of the present invention of the weather strip to be installed to the door.
Figure 10:
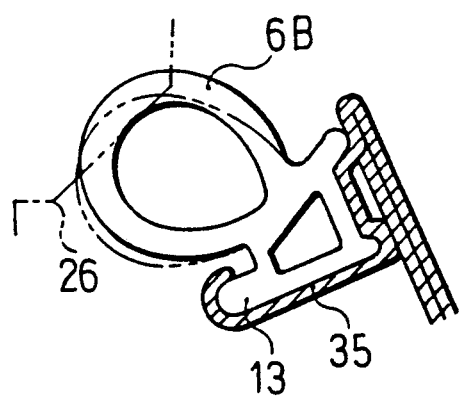
FIG. 10 is a cross-sectional view which illustrates a state where a weather strip for use in a door sash portion.

(3) FIG. 9 is a side elevational view illustrating the surface of an extruded work for use in the embodiment of the weather strip in which the present invention is embodiment in that shown in FIG. 10.

This weather strip comprises a installation base portion 13 to be installed to the door side sash 25 and a hollow sealing portion 6B projecting over this installation base portion 13 toward inside of the car body.

According to the structure of this embodiment, in order to obtain a predetermined sealing interference in the corner portion C of the hollow sealing portion 6B, the cross-sectional shape thereof is arranged to be vertically elongated shape with respect to that of the straight portion S (its cross-sectional shape is shown by an alternate long and two short dashes line) in the sealing direction. The other portions, that is, the straight portions are formed in the shape obtained from extrusion as it is.

This extruded work w is then cut to become a predetermined length similarly to the above-described embodiment, and the two ends thereof is connected to each other as to form an endless weather strip.

Figure 11:
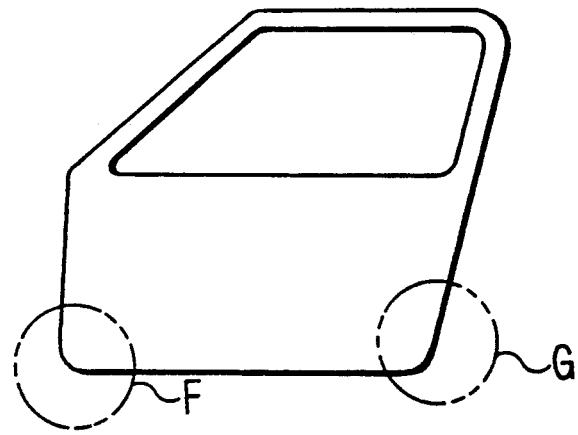
FIG. 11 is a partial cross-sectional view of a door for illustrating the positions for the weather strip for use in the door sash portion.

The thus-manufactured weather strip can compensate, similarly to the above-described description, the deformation shown in the alternate long and two short dashes line in the corners F and G of the hollow sealing portion 6B after the same has been installed to the door in a car body shown in FIG. 11. Therefore, the sealing interference in the hollow sealing portion 6B can be easily secured.

Figure 12:
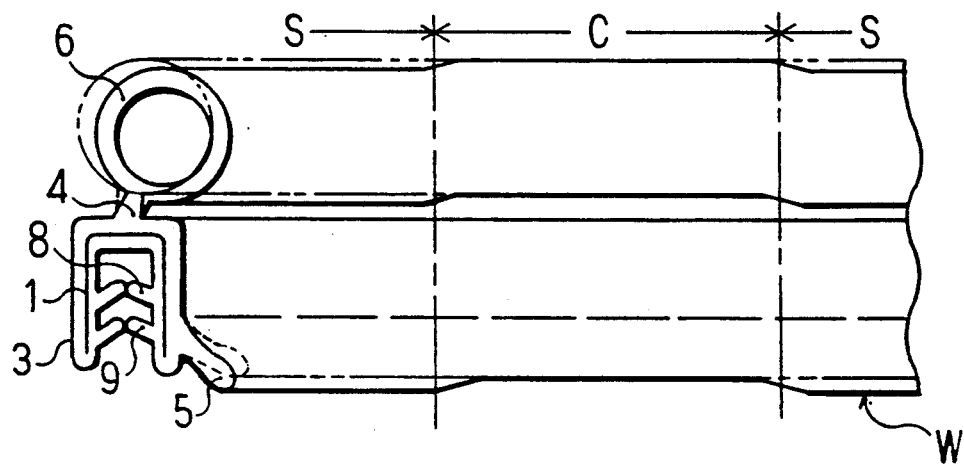
FIG. 12 is a side elevational view illustrating the surface of an extruded work for use in the other embodiment of the weather strip for use in the trunk portion.
Figure 13:
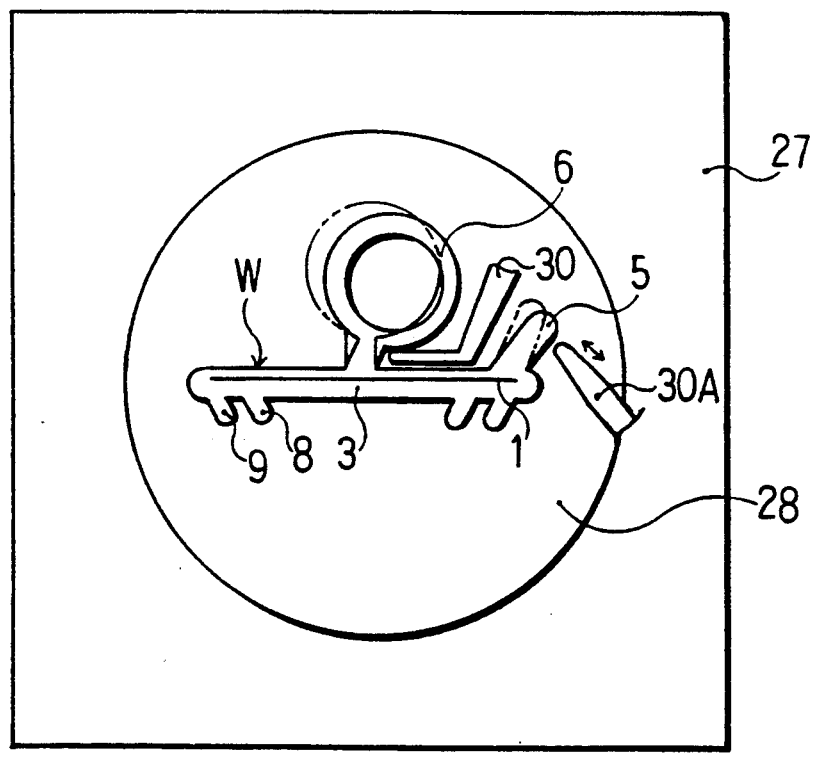
FIG. 13 is a front elevational view which illustrates an example of a method of manufacturing an extruded work.

(4) FIG. 12 is a side elevational view illustrating the surface of a product formed by the extrusion for use as a weather strip for the trunk portion shown in FIG. 1 according to an embodiment other than (1).

The difference from (1) lies in the manner of the compensation and the fact that a lip seal is added as to serve as the portion to be subjected to the compensation.

According to this embodiment, both the corner portion C of the hollow sealing portion 6 and the lip seal 6 are raised as to become a predetermined shape after the corner portion has been formed (its cross-sectional shape is shown by an alternate long and two short dashes line). The other portions, that is the straight portions S, are formed in the section obtained by extrusion as it is.

This weather strip can be manufactured by, for example, the following method:

a first and a second forming levers 30 and 30A are each disposed immediately in front of the extruding die 28 installed to the extruding head 27 of an extruder for deforming the hollow sealing portion 6 and the lip seal 5 as illustrated. The neck portion 4 of the hollow sealing portion 6 of the extruded material w which has not been as yet subjected to the valcanization and the lip seal portion 7 are respectively pressed by the first and second forming levers 30 and 30A so that the required distance, that is, this corner portion C is deformed. The other portions are the same as that disclosed in the embodiment (1).

Figure 3:
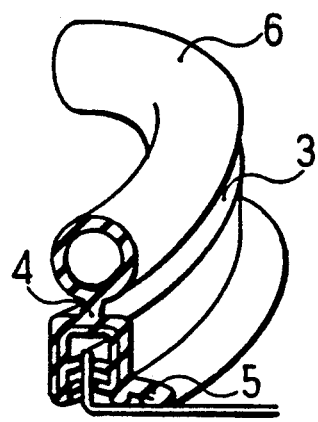
FIG. 3 is a partial perspective view which illustrates a state where the weather strip for the trunk portion is installed.

The thus-manufactured weather strip is installed, similarly to the embodiment (1), to the car body flange 21 in the trunk portion. In this state, the corner C has been previously deformed as to become a predetermined shape. As a result, the following problems can be overcome: the hollow sealing portion 6 falls toward the outside of the car body at the corner C, causing for the interference of the portion of the trunk lid 23 obtained by compressing the hollow sealing portion 6 when the trunk is closed cannot reach a predetermined valve, or a problem that the lip seal 7 deforms downward, causing for the weather strip to be turned inside, as shown in FIG. 3, when the same is installed to the car body.

Figure 14:
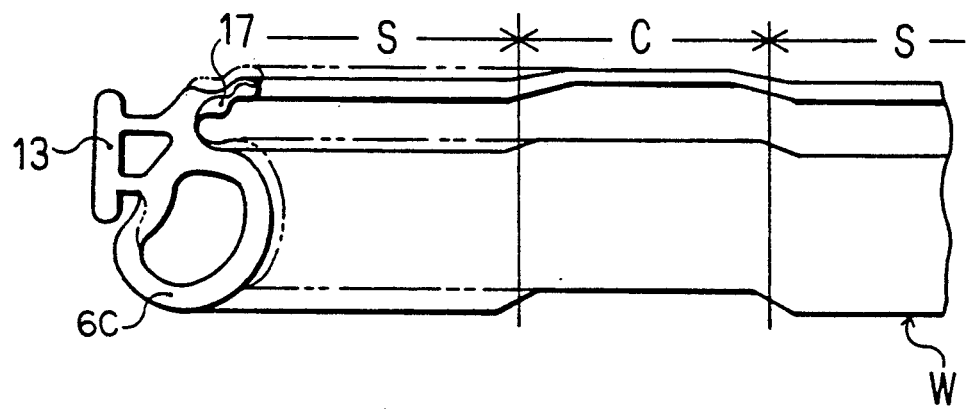
FIG. 14 is a side elevational view illustrating the surface of an extruded work for use in the other embodiment of the weather strip.
Figure 15:
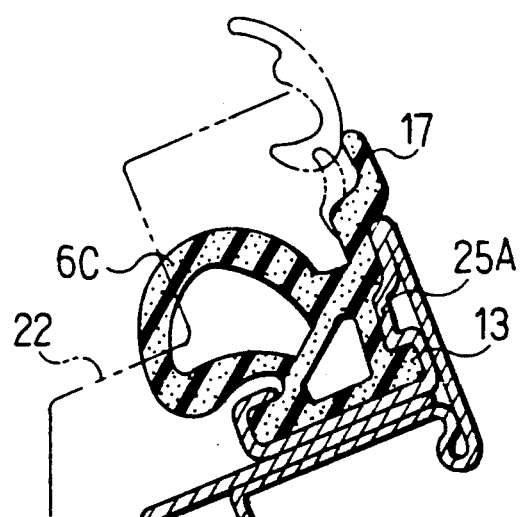
FIG. 15 is a cross-sectional view which illustrates state where the door weather strip for use in the door sash portion is installed.

(5) FIG. 14 is a side elevational view illustrating the surface of a product formed by the extrusion for use in the other embodiment of the weather strip for use in the door sash.

This weather strip comprises an installation base portion 13 to be installed to the sash rail 25A of the door, hollow sealing portions 6C branched from this installation base portion 13 and extended, and a shielding lip 17.

Figure 16:
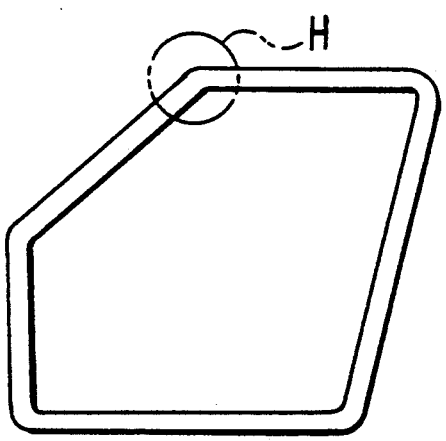
FIG. 16 is a plan view which illustrates a state where the same is joined as to form a ring.

According to this embodiment, both the corner portion C of the hollow sealing portion 6C and the shielding lip portion 17 are raised to become the predetermined shapes respectively after the corner portion has been formed (its cross-sectional shape is shown by an alternate long and two short dashes line). The other portions, that is the straight portions S, are formed to the shape obtained from extrusion as it is. This extruded work w is, similarly to the above-described embodiments, cut to become a predetermined length, and the two ends thereof are connected to each other so that an endless weather strip as shown in FIG. 16 is obtained.

The thus-manufactured weather strip can compensate the deformation in the corner H similarly to the above-described embodiments so that the problems upon the sealing performance and the appearance can be prevented.

In each of the embodiments described above, although both the hollow sealing portion and the lip seal or the shielding lip are deformed to compensate the deformation, either one of them may be deformed depending upon the shape of the hollow sealing portion, lip seal and the shielding lip portion and the degree of curvature of the corner. B. Then, a method and device suitably used for manufacturing the weather strip according to the above-described embodiments will be described with reference to a case where a weather strip for trunk portion is manufactured.

Figure 17:
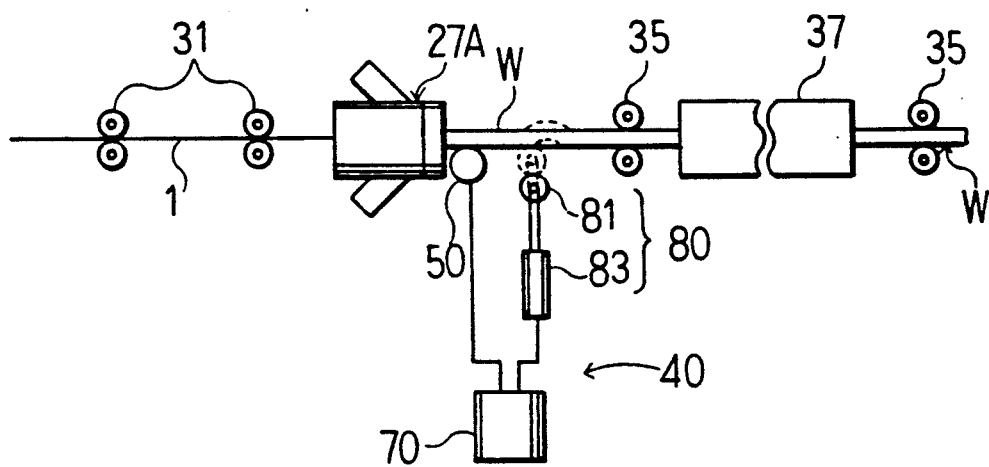
FIG. 17 is a view which illustrates illustrates the process of manufacturing the weather strip according to the present invention.

FIG. 17 is a view which illustrates a process of manufacturing the weather strip according to the embodiments This manufacturing method comprises (1) a process in which the extruded work w which has not as yet been subjected to the vulcanization is subjected to the extrusion, (2) a process in which thus-extruded work w is plastically deformed, (3) a process in which the thus-plastically deformed extruded work w is subjected to the vulcanization, and (4) a process in which the thus-vulcanized extruded work w is cut.

(1) Process in which the weather strip w which has not as yet been subjected to the vulcanization is subjected to the extrusion:

a plate-like insert 1 is introduced into a cross head 27A by two pairs of supply roller 31, and rubber (EPDM or the like) is also introduced into the cross head 27A so that the extruded work w which has not as yet been subjected to the vulcanization is, similarly to the conventional method, formed.

Since the insert 1 is embedded in such a weather strip which has not as yet been subjected to the vulcanization, its axial length is not substantially changed even after it has been extruded. The material of this insert is not limited to the metal sheet work, only required being that the contraction is impossible to occur or that which has a contraction which can be estimated. For example, a band material braided by metal fiber or synthetic resin may be employed (see Japanese Patent Laid-Open No. 59-114040).

(2) A process in which thus-extruded work w is plastically deformed:

The hollow sealing potion 6 of the extruded work w extruded from the head 27A and which has not as yet been subjected to the vulcanization is pressurized from outside during the movement of it so that the same is plastically deformed. The portion which is capable of being plastically deformed is not limited to the hollow sealing portion 6. The holding lip portions 8 and 9 and lip seal portion 5 shown in FIG. 1 can be plastically deformed. The direction in which the pressure is applied is not limited. It may be applied to the direction of the movement of the extruded work in the vertical direction, inclined direction, and the same axial direction to that of the axis of the movement. Furthermore, this hollow sealing portion 6 may be deformed in a sandwiched manner.

In addition, the time at which the pressure is applied is not limited, only the necessity being that it may be applied after the vulcanization has been advanced and before it is completed. In order to easily deform it, it can be performed during softening the weather strip in the vulcanization process. In a case where a great deformation is required to occur, the time of pressurization may be distributed for the purpose of reducing the pressure applied to one place.

Reference numeral 35 in this drawing represents an intake roller. As means for applying pressure, a forming device 40 described hereinafter is used. The present invention is not, of course, limited to this.

A pressure needs to be applied periodically for the purpose of forming a deformed portion at a predetermined intervals through the extruded work w which is continuously extruded.

(3) A process in which the thus-plastically deformed extruded w is subjected to the vulcanization:

In this process, the extruded w which has not as yet subjected to the vulcanization is as it is introduced into the vulcanizing tank 37 during the movement. As the method of vulcanization, an usual continuous-vulcanizing method such as combination of the microwave vulcanization and heat air vulcanization may be employed.

As a result of this process, the deformed portion which has been formed in the previous process is solidified.

(4) In the above-described process, the weather strip w is continuously manufactured. Then the extruded work is cut to become a predetermined length to be fit to the corner portion of the door sash corner.

As a result, the weather strip is obtained as a product.

Next, the forming device 40 according to the embodiments will be described with reference to FIG. 18.

This forming device 40 comprises (a) means 50 for detecting distance of movement, (b) control means 70, and (c) forming means 80.

Figure 18:
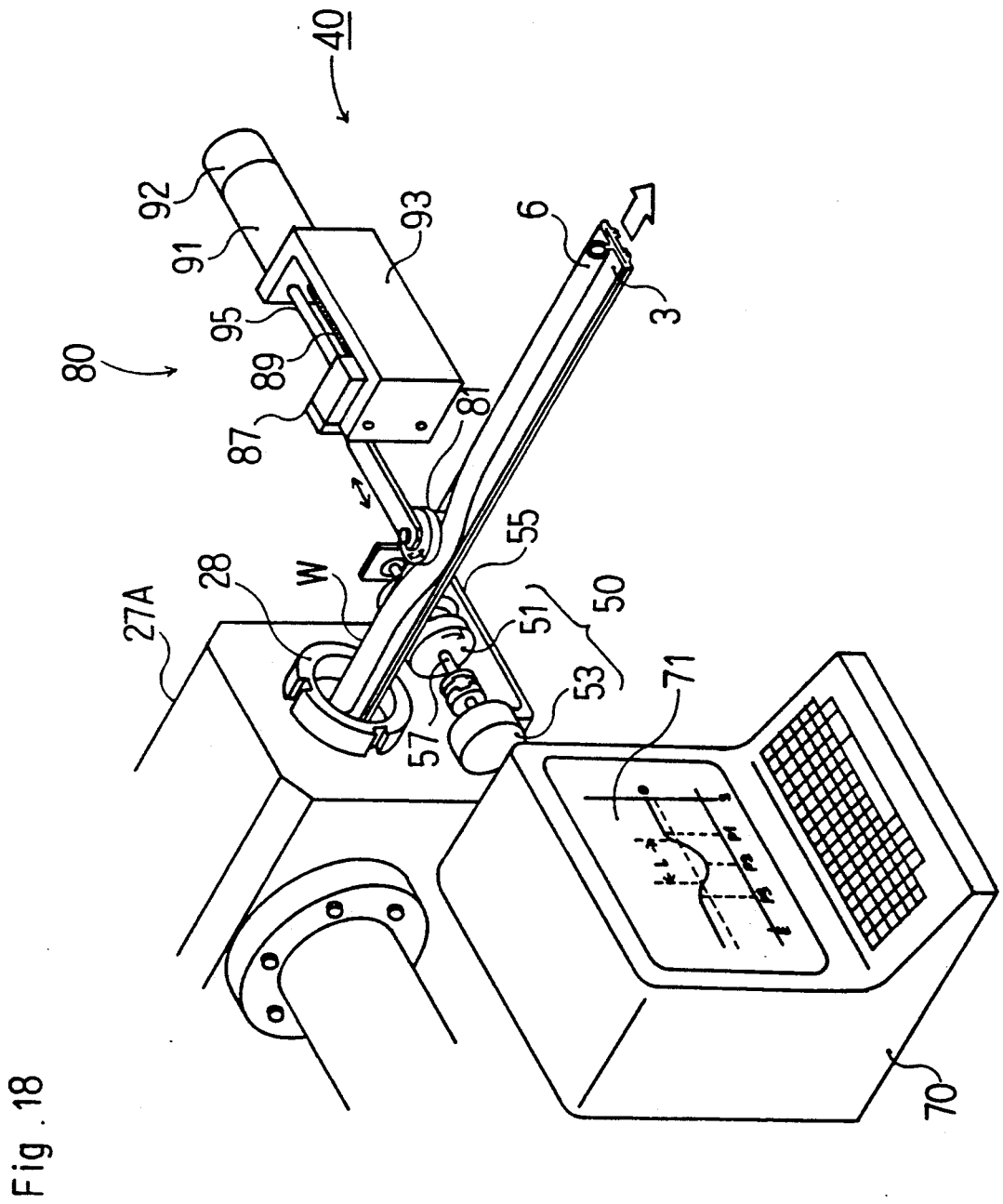
FIG. 18 is a perspective view which illustrates a forming device according to the embodiment.

(a) the means 50 for detecting distance of movement comprises, as shown in FIG. 18, a rotor 51 and a rotary encoder 53, and is disposed in the vicinity of the extrusion port. The roller 51 is pivotted by a frame 55 in a state where the outer surface thereof is brought into contact with the lower surface of the extruded work w which has not as yet been vulcanized. The shaft 57 of it is connected to the rotary shaft of the rotary encoder 53. Therefore, the roller 51 is rotated following the movement of the extruded work w, and the rotary encoder 53 is rotated in synchronization with the rotation of the roller 51. As a result, the distance of straight movement of the extruded work w is converted into the degree of rotation of the rotary encoder 53, causing a signal (pulse signal) representing the degree of rotation to be output.

Figure 19:
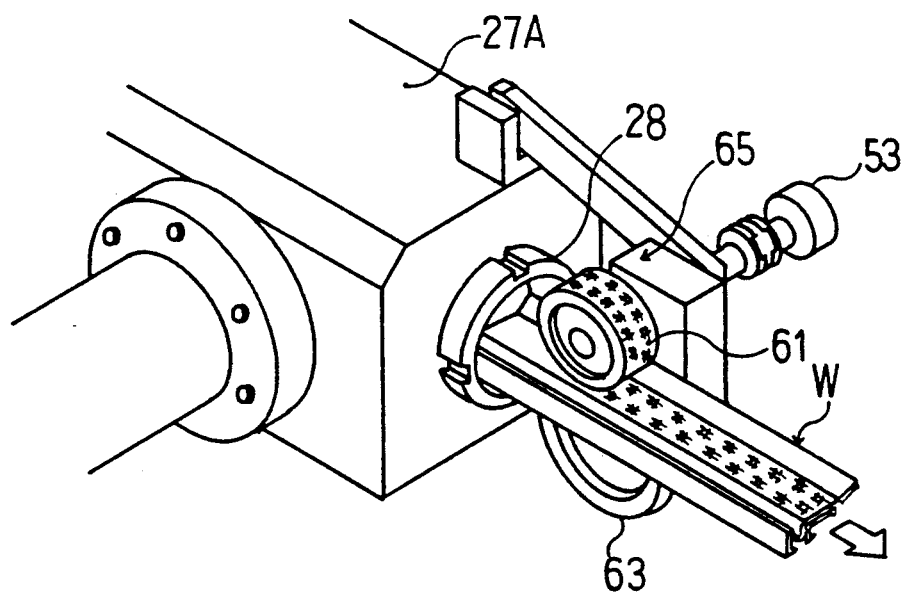
FIG. 19 is a perspective view illustrating a forming device equipped with means for detecting length of movement, this means which differs from that shown in FIG. 18.

Although in the example shown in FIG. 18, the roller 51 is brought into contact with the lower surface of the extruded work w, it may, of course, be brought into contact with the top surface of the side surface of the extruded work w. Furthermore, as shown in FIG. 19, when slight embossments are intended to be formed on the extruded work w, the rotary encoder 53 may be connected to a pattern forming roller 61. As a result, the slippage between the extruded work w and the pattern forming roller 61 can be surely prevented. Reference numeral 63 represents a retention roller, and reference numeral 65 represents a embossing roller unit.

The position of the roller 51 is not specifically limited. It may be brought into contact with the insert 1, or it may be brought into contact with extruded work w disposed behind the forming means 80.

The method of detecting the distance of movement of the weather strip after the distance of movement has been converted to the degree of rotation is described. Alternatively, the distance of movement of the extruded work w may be detected by the other known methods such as an optical method and an air method.

(b) The movement distance signal output from the above-described rotary encoder 53 is input to the control means 70. This control means 70 includes a CPU which has been programmed in such a manner that this CPU makes a comparison between a predetermined movement distance of the weather strip which has been previously input and the present movement distance which can be obtained by adding the movement distance signals. Furthermore, this CPU is programmed in such a manner that it makes a comparison between the present degree of rotation (which corresponds to the present position of the pressurizing portion 81) which can be obtained by the rotational degree signal (pulse signal which is input from a rotary encoder to be described hereinafter) and a predetermined degree of rotation of a motor 91 which has been input previously. As a result of this, a driving signal is output. As the receipt of this drive control signal, the forming means 80 is actuated so that a pressure is applied to a predetermined position of the weather strip which has not as yet been vulcanized in the direction perpendicular to the moving direction of the same.

The predetermined movement distance of the weather strip and the predetermined degree of rotation of the motor are arranged to be changed by the outside input device as needs.

Figure 20:
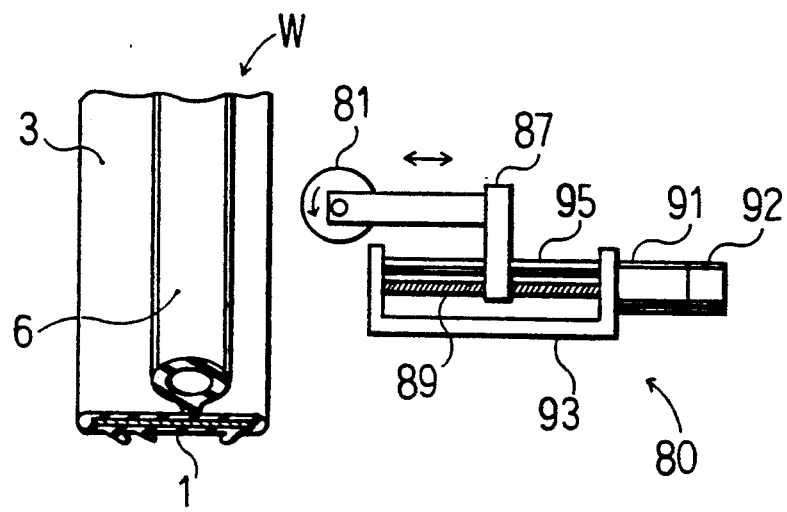
FIG. 20 is a plan view illustrating the forming device.

(c) The drive control signal output from the above-described control means 70 is input to the forming means 80. This forming means 80 comprises a pressurization portion 81 and its moving device 83 (see FIG. 20).

Figure 21:
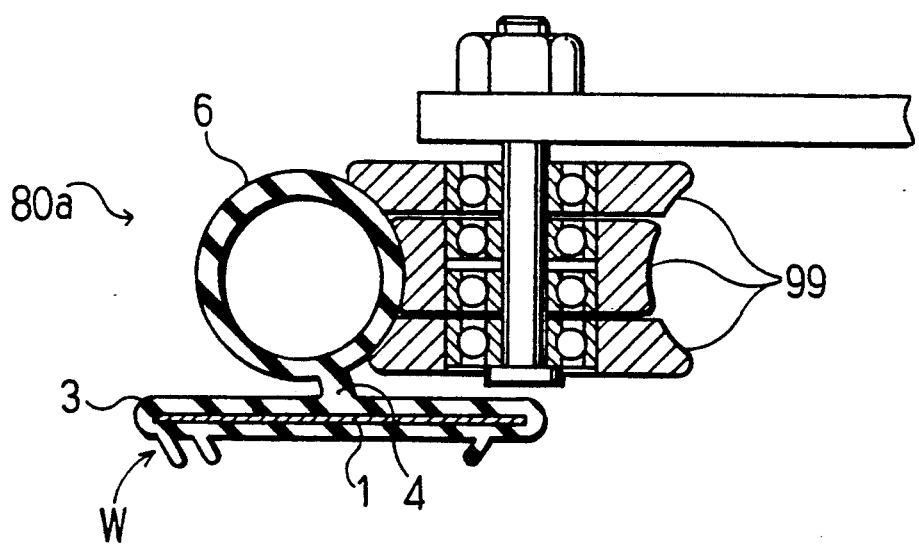
FIG. 21, 22, and 23 are views each of which illustrate the forming means according to the corresponding embodiments.

As the pressurizing portion 81, a follower roller is used. The reason for this lies in that defective lines or the like needs to be prevented from generation when the pressurizing portion 81 is abutted against the extruded work w which has not as yet been vulcanized. In order to further assuredly prevent them, it is preferable for the roller 99 to be arranged as shown in FIG. 21. This roller 99 has an outer surface thereof in the form which corresponds to the surface of the hollow sealing portion 6. As a result of this, the roller 99 is prevented from coming contact with the hollow sealing portion 6 in an eccentric manner. In addition, since this roller 99 is divided into three pieces, the thus-divided pieces can rotate smoothly following the hollow sealing portion 6. As a result of this, the damages of this hollow sealing portion 6 can be prevented.

This roller may, of course, be divided into two pieces or four pieces or more, or it may not be divided.

Figure 22:
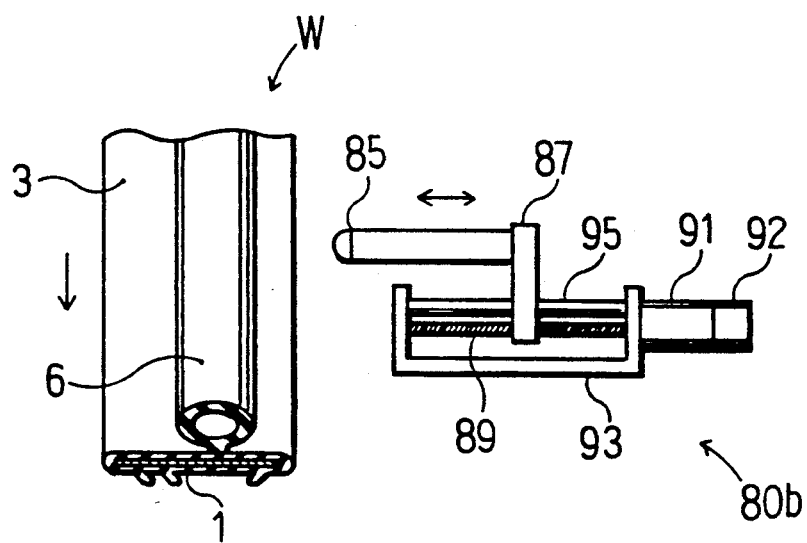

On the other hand, as an alternative to the follower roller, a round head equipped rod 85 as shown in FIG. 22 may be used regarding of the physical properties of the extruded work w or the position at which the deformation is formed. Furthermore, the pressurizing portion 81 may comprise a drive roller.

The moving device 83 comprises a support member 87 of the pressurizing portion 81, screw 89, motor 91, and a rotary encoder 92. Reference numeral 93 represents a base, and reference numeral 95 represents a guide lod for the support member 87. This support member 87 is connected with the screw 89 in a screw pair manner, and this screw 89 is secured to the rotational shaft of the motor 91. As a result, the support member 87 is caused to be moved in the axial direction of the screw 89 in accordance with the degree of rotation of the motor 91 (the number of rotations and the direction of the rotation). As the motor 91, a servo motor or a stepping motor may be employed. The rotary encoder 92 is also connected to the rotational shaft of the motor 91 so that it outputs the degree of rotation of the motor 91 as the signal representing the degree of rotation.

When the drive control signal is input from the control means 70 to the motor 91, the motor 91 starts its rotation, and the signal representing the degree of rotation is fed back from the rotary encoder 92 to the control means 70. In response to this signal representing the degree of rotation, the control means 70 makes a comparison between the present degree of rotation of the motor 91 and the previously input degree of rotation so that a drive control signal which causes the motor 91 to rotate in accordance with this predetermined degree of rotation is output to the motor 91.

The degree of rotation of the motor 91 is arranged to correspond to the relative position between the pressurizing portion 81 and the extruded work w.

As described above, the structure is arranged to employ the motor 91 as the moving device 83. Alternatively, the moving device may be structured by a hydraulic pressure circuit, a cam and cam follower, and a crank mechanism or the like.

Figure 23:
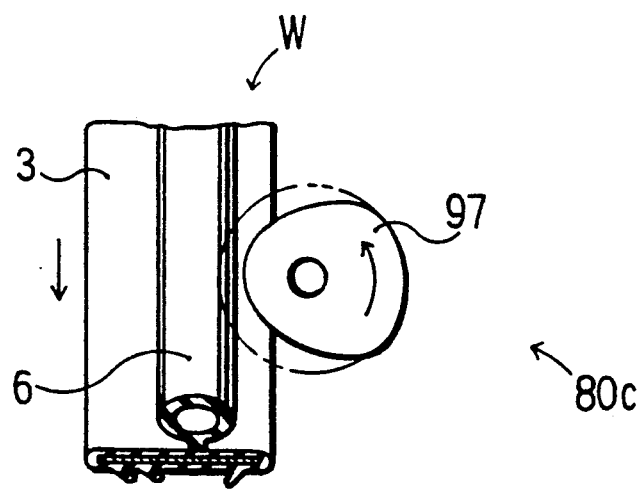

Furthermore, as shown in FIG. 23, the forming means may be composed of only the cam 97. In this case, the trigger drive control signal is output from the control means 70. The cam 97 is rotated once by a drive motor (omitted from illustration) in response to this signal.

As a result of the additional provision of such forming device 40 to a manufacturing line of the weather strip which is provided with no deformed portion, this manufacturing line (the manufacturing line for the weather strip provided with the deformed portion) can be made the same as that of the present invention.

The manner to use the forming device according to this embodiment will be described.

A predetermined movement distance of the extruded work w and a predetermined degree of rotation of the motor 91 needs to be determined in the control means 70. Since this predetermined degree of rotation corresponds to the position of the pressurizing member 81, the relationship between the predetermined movement distance and the predetermined degree of rotation becomes as illustrated by a chart of CRT 71 of the control means 70 shown in FIG. 18. Referring to this chart, the predetermined movement distance should be read along the abscissa, while the predetermined degree of rotation of the motor 91 should be read along the ordinate. Symbols S to E represent the unit length of the weather strip as a product. Numeral 0 indicates a fact that the degree of rotation of the motor 91 is zero (that is, the motor 91 is stopped, and the pressurizing portion 81 is positioned away from the extruded work w).

Thus, the extrusion of the work w is started. When this extrusion state becomes stable, this forming device 40 is operated. This state corresponds to symbol S expressed on the abscissa of the chart. In this state, the drive control signal is not output form the control means 70, therefore the motor 91 is not rotated. Then, in accordance with the extrusion of the work w, its distance of movement is input from the rotary encoder 53 as the signal representing the distance of movement to the control means 70. Since this signal representing the distance of movement is input in the form of a pulse, the CPU of the control means 70 adds these pulses. As a result, the present distance of movement of extruded work can be obtained. Referring to the chart, it is shifted from S to the left.

When the present movement distance of the extruded work w reaches Pl in the chart (the predetermined distance of movement), the drive control signal is output from the control means 70 so that the motor 41 starts rotating in the direction causing the pressurizing portion 81 to come closer to the extruded work w. This degree of rotation is input to the control means 70 as the signal representing the degree of rotation via the rotary encoder 92. The control means 70 outputs the control drive signal to the motor 41 as to make the degree of rotation of the motor 91 to conform the chart.

In this chart, the pressurizing portion 81 abuts against the hollow sealing portion 3 of the extruded work w in the range L. As a result, this hollow sealing portion 3 is caused to be plastic-deformed. When the present distance of movement of the extruded work w reaches P2 in the chart, the driving control signal is output from the control means 70 as to invert the motor 91. Then the rotation of this motor 91 is stopped at P3.

Next, when the present distance of movement of the extruded work w reaches E, one cycle is thus completed. Symbol E aligns to S in the next cycle.

In the forming device 40 according to the above-described embodiment, in a case where two or more deformed portions 10 are formed in a unit length of the extruded work w, it needs to determine a predetermined distance of movement of the extruded work w and a predetermined degree of rotation of the motor 91 for the purpose of drawing two or more concave portions in the chart.

What is claimed is:

1. A length of weather stripping for use on an automobile comprising:
   an engaging portion for engaging a portion of the automobile defined peripherally about an opening provided on the automobile; and
   a projecting sealing portion connected to said engaging portion for providing a seal acting in a direction projecting outwardly from said opening toward a member operatively attached to the automobile for closing the opening, said weather strip having at least one straight portion extending along a predetermined length thereof and being formed with a first cross-sectional shape to thereby define a first engaging surface and at least one corner portion, integrally formed with said straight portion, said corner portion having a second cross-sectional shape that is elongated with respect to said first cross-sectional shape in the sealing direction to form a second engaging surface projecting outwardly from said first engaging surface to provide a sealing interference with the member when the weather strip is installed on the automobile and the member closes the opening.

2. A weather strip as in claim 1, wherein said sealing portion is a lip sealed portion.

3. A weather strip as in claim 1, wherein said sealing portion is a hollow sealing portion.

4. A weather strip as in claim 3, wherein said engaging portion includes an installation base portion installed to a sash rail of a door of an automobile, said hollow sealing portion being connected to said installation base.

5. A weather strip as in claim 3, further comprising a lip seal portion projecting outwardly from said engaging portion to provide a seal with the automobile.

6. A weather strip as in claim 5, wherein said lip seal portion is connected to said engaging portion so as to extend along the weather strip, said lip seal portion being vertically upwardly offset along said corner portions relative to the position of the lip seal portion extending along said at least one straight portion so as to obtain a sealing interference along the corner portions.

7. A weather strip as in claim 5, wherein both said lip seal portion and said hollow sealing portion are formed along said corner portions to obtain said sealing interference.

8. A weather strip as in claim 5, wherein said engaging portion includes an inverted U-shaped folding portion and said hollow sealing portion and said lip seal portions are each connected to the inverted U-shaped folding portion, respectively.

9. A weather strip as in claim 8, wherein said lip sealing portion is connected to said inverted U-shaped folding portion.

10. A weather strip as in claim 9, wherein both said lip seal portion and said hollow sealing portion are formed at said corner portions so as to obtain said sealing interference.

11. A length of weather stripping for an automobile comprising:
   an engaging portion for engaging a portion of the automobile defined peripherally about an opening of the vehicle; and
   a projecting hollow sealing portion connected to said engaging portion,
   said engaging portion comprising an inverted U-shaped portion having a top portion with said hollow sealing portion being connected to the top portion thereof,
   said weather strip being formed with at least one corner portion and at least one straight portion extending along predetermined lengths thereof, said corner portion being formed integrally with said straight portion, said corner portion of said weather strip being formed with a cross-sectional shape that is elongated in the sealing direction of the weather strip and with respect to the cross-sectional shape of said straight portion so as to provide a seal about the opening when the weather strip is installed in the automobile.

* * * * *

UNITED STATES PATENT AND TRADEMARK OFFICE
CERTIFICATE OF CORRECTION

PATENT NO. : 5,099,612

DATED : March 31, 1992

INVENTOR(S) : Keizo HAYASHI and Masahiro NOZAKI

It is certified that error appears in the above-identified patent and that said Letters Patent is hereby corrected as shown below:

On the Title page:

Item (75) inventors, should read--

Keizo Hayashi, Nagoya;
        Masahiro Nozaki, Aichi,
        both of Japan

--.

Signed and Sealed this

Twenty-first Day of December, 1993

*Attest:*

BRUCE LEHMAN

*Attesting Officer*      *Commissioner of Patents and Trademarks*